April 27, 1965  B. MIKUSCH ETAL  3,180,241
PHOTOGRAPHIC OR CINEMATOGRAPHIC CAMERA
Filed June 12, 1962  2 Sheets-Sheet 1
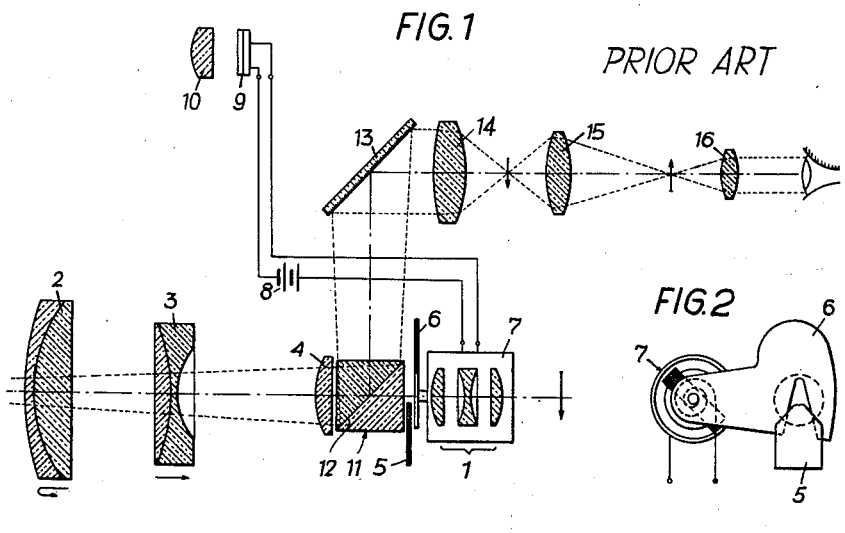

April 27, 1965  B. MIKUSCH ETAL  3,180,241
PHOTOGRAPHIC OR CINEMATOGRAPHIC CAMERA
Filed June 12, 1962  2 Sheets-Sheet 2
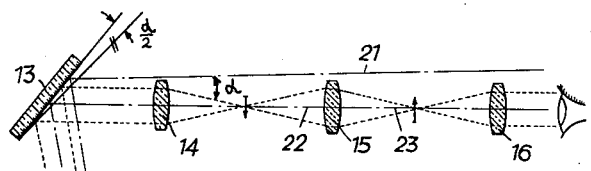
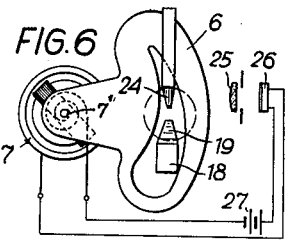
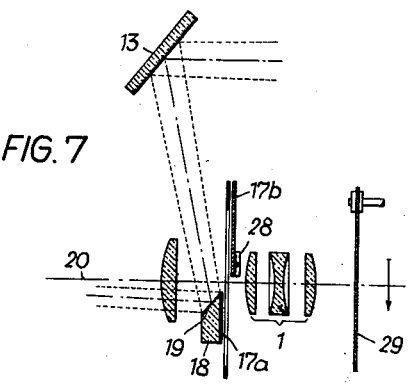
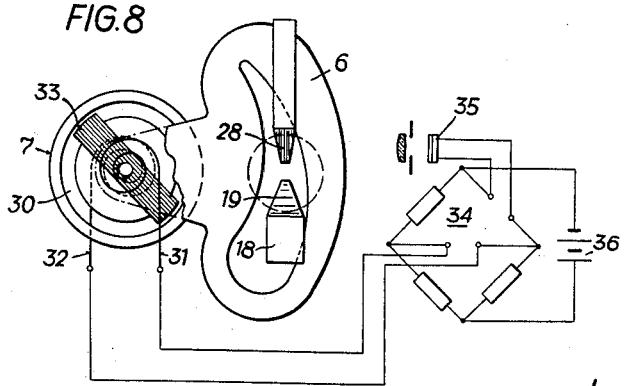

United States Patent Office 3,180,241
Patented Apr. 27, 1965

3,180,241
PHOTOGRAPHIC OR CINEMATOGRAPHIC
CAMERA
Berta Mikusch and Harald Wessner, Vienna, Austria, assignors to Karl Vockenhuber and Christl Hauser, both of Vienna, Austria
Filed June 12, 1962, Ser. No. 201,878
Claims priority, application Austria, July 7, 1961, A 5,238/61
8 Claims. (Cl. 95—64)

The present invention relates to a photographic or cinematographic camera, which has in the lens aperture a movable diaphragm blade with a tapered opening and at least one stationary mask, whereby eventually the moving diaphragm blade is controlled by a galvanometer energized by a photocell depending upon the light conditions of the scene.

In diaphragm systems with a single movable diaphragm blade, stationary masks are provided, in order to create a more favorable shape and position of the diaphragm aperture mainly in the range of small lens apertures. Various embodiments of stationary masks have been known. It has been thus suggested, to provide a stationary mask which is sectionally shaped in relation to the optical axis. Masks have been known also, which cover up a segment of the lens aperture. In addition to arrangements having a single stationary mask, there are also other arrangements having two oppositely disposed, stationary masks.

A more advantageous shape of the diaphragm aperture, in comparison to a single blade diaphragm without stationary mask, is achieved by a loss in the obtainable maximal aperture. The stationary mask, the area of which amounts to approximately 25% of the lens aperture, remains in the path of rays of the objective in all settings and thus reduces the maximum transmitting power of the objective by half an f-stop.

A further reduction of the transmitting power occurs in many constructions also by the arrangement of a partially mirror coated prism in the path of the rays of the objective, through which approximately 10–20% of the entering light is reflected in the viewfinder.

It is one object of the present invention to provide a photographic or cinematographic camera, wherein the light impinging upon the stationary mask is used for supplying a viewfinder and a photocell, respectively, which light has been dissipated in known structures.

It is another object of the present invention to provide a photographic or cinematographic camera, which includes a mirror on the stationary mask, preferably on the side averted from the movable diaphragm blade, which mirror is inclined to the optical axis and is adapted to supply a viewfinder and a photocell or the like, respectively, with the light impinging on the mask. The very expensive and relatively large, partially mirror coated prism can thus be dispensed with and be replaced by a small mirror, the production of which is considerably more economical. By omitting the prism, the construction length and the diameter of the total objective are reduced. Finally, by eliminating the partially mirror coated prism, which in the main represents a thick glass-plate having parallel faces, the quality of the optical image is improved, as the aberrations induced by this plate do no longer occur. But besides these advantages the higher transmitting power of the overall optical system, achieved thereby, is of decisive importance.

With these and other objects in view, which will become apparent in the following detailed description, the present invention will be clearly understood in connection with the accompanying drawings, in which:

FIG. 1 is an axial section of the optical construction of a known camera;
FIG. 2 is a view of the pertaining diaphragm system;
FIGS. 3, 5 and 7 are axial sections through optical systems according to the present invention;
FIG. 4 is a view of the diaphragm system of the arrangement shown in FIG. 3; and
FIGS. 6 and 8 are diaphragm systems, as well as the pertaining circuit diagrams, of the arrangement shown in FIGS. 5 and 7 respectively.

Referring now to the drawings, and in particular to FIG. 1, an axial section through the optical system of a mirror-reflex substandard film camera is shown, which camera is equipped with a variofocal objective. The objective consists of a main objective 1 of fixed focal length and an attachment with variable enlargement, which has a slidable positive front component 2, a slidable negative component 3 and a stationary positive component 4.

Upon changing the enlargement factor, the negative component 3 is shifted linearly with the change of the overall focal length of the objective, the shifting of the positive front component 2 is, however, effected according to a hyperbolic law of motion. Due to the variofocal attachment at a finite distance in front of the front component 2 a virtual image is formed, the position of which is retained constant by the control of the movement of the front component 2 and the negative component 3. The virtual image is portrayed on the film by the main objective 1. A diaphragm is arranged in front of the main objective 1 and consists of one stationary mask 5 and another mask 6, which is fastened to a shaft 7' of a moving-coil galvanometer 7 and adjustable by the shaft 7'. A battery 8 supplies electric current to the galvanometer 7 by means of a photo resistor 9 according to the light conditions prevailing on the scene. A lens 10 disposed in front of the photo resistance 9 serves the purpose of limiting the measuring angle. A prism 11 of partial transmittance is provided between the positive component 2 of the objective and the diaphragm 5 and the surface 12 of the prism 11 reflecting approximately 10–20% of the light entering the objective 1 in the viewfinder. The optical axis of the viewfinder is aligned parallel to the optical axis of the objective 1 by means of a mirror 13. A viewfinder objective 14 forms a true image of the scene. The image erecting system 15 produces a second true image, which is viewed through the eye piece 16. It is readily apparent from the showing in FIG. 1 that the prism 11 shows a relatively large axial extension, whereby not only the length of the objective, but also the diameter of the lenses 2, 3 and 4 compared with an objective without a prism of partial transmittance is increased. Of disadvantage are furthermore the high costs of the prism 11 consisting of two cemented prisms and the difficult production of the partially transmitting mirror coating on the hypotenuse surface 12 of one of the two component prisms.

Referring now again to the drawings, and in particular to FIG. 3, which discloses the design according to the present invention, the mentioned disadvantages of the known structure are avoided. In this arrangement, which is similar to the arrangement shown in FIG. 1, regarding the basic construction of the objective, a small glass prism 18 is fastened on the stationary diaphragm mask 17, which extends in the shape of a sector into the objective aperture; the surface 19 of the glass prism 18 is totally mirror-coated. No additional loss of light for the objective occurs through the glass prism 18, as it covers merely the initially opaque mask parts.

The mirror coat of the glass prism 18 is not necessarily exactly in the plane of the aperture stop. The size and the position of the mirror coat is to be determined by the rays received by the coated mirror face. The light beam reflected on the surface 19 is deviated again through a mirror 13. A first intermediate image is formed by means of the viewfinder lens 14, and a second image is formed through the image erecting system 15, which second image is viewed through an eye piece 16. As the mirror surface 19 cover mainly the marginal zone of the objective aperture and does not reach the rays near its axis, the light beam reflected in the viewfinder is taken off center relative to the optical axis 20 or its imaginary extension 21 in the viewfinder. In the example shown in the drawing, the optical axis of the objective, which is extended into the viewfinder, coincides with the optical axis 22 of the optical system of the viewfinder. Thus, a displacement of the exit pupil also occurs. In order to avoid a vignetting in the viewfinder path of rays, the lenses 14, 15 and 16 must be of a relatively big diameter. The remarkable shortening of the objective and the decrease of the diameter of the lenses 2, 3 and 4 are clearly indicated in the drawing. By omitting the partially mirror coated prism, the aberrations caused by the thick plate having parallel planes also do not occur, so that the quality of the image is increased. The electrical supply of the galvanometer 7 is effected in the same manner as shown in FIG. 1.

Referring now again to the drawings, and in particular to FIGS. 5 and 6, an embodiment is disclosed, which differs from that shown in FIG. 3 first of all by the formation of the diaphragm blades 6 and 17. While, according to FIGS. 3 and 4, the blade 17 reaches with a single mask in the shape of a sector in the lens aperture and the accompanying movable blade has a substantially triangular aperture, according to the embodiment shown in FIGS. 5 and 6, two oppositely disposed masks in the shape of a sector are provided. The movable diaphragm blade 6 has a decreasing crescent-shaped aperture. The totally mirror coated prism 18 is fastened to the bigger one of the two masking sectors. The mirror surface 19 encloses together with the optical axis 20 an angle of about 40°, so that a vignetting of the pencil of rays on the blade 17 does not occur. Deviating from the previous embodiment, the mirror surfaces 19 and 13 are not parallel. Moreover, the mirror 13 is displaced from the parallel position to mirror 19 by an angle α/2, if α is the angle between the rays 21 and 23 of the viewfinder. As a result, the center-of-gravity-ray 23 of the light beam through the viewfinder runs parallel to the optical axis 20 of the objective. In this arrangement, the imaginary extension 21 of the optical axis of the objective into the viewfinder is no longer parallel to the optical axis 20.

In the example shown in FIG. 5, the optical axis 22 of the optical system of the viewfinder and the center-of-gravity-ray 23 of the light beam coincide in the viewfinder, so that the exit pupil lies concentric to the optical axis 22. Besides the advantages in the handling, the possibility to develop the viewfinder objective, the image erecting system and the eye piece with a smaller diameter is thus given.

On the smaller mask a fully mirror coated glass prism 24 is provided, which reflects a second light beam approximately normal to the plane determined by the axes 20 and 21. Over an objective 25 the second light beam is fed to a photo resistor 26, disposed in a circuit which includes a battery 27 and a galvanometer 7. Thus, approximately 10% of the amount of light impinging upon the objective can be fed to the photo resistor 26, without reducing the light flux which reaches the film. It is an advantage of this arrangement, that the measuring angle of the photo resistor 26 always coincides with the object angle of the camera objective. Any interference with the result of measurement of the exposure control by surfaces situated outside the scene is thus excluded.

Referring now to FIGS. 7 and 8 of the drawings, a detail of a modified solution in comparison with the embodiment shown in FIGS. 5 and 6 is disclosed. The objective itself and the viewfinder path of rays are unchanged.

Unlike the above described arrangement, two masks 17a and 17b are arranged in different, parallel planes, between which the diaphragm blade 6 is rotatably mounted. The mask 17b carries a small, fully mirror coated prism 28. Between the main objective 1 and the film, the position of which is indicated schematically by the shown image, a shutter 29 is provided, the side of which facing the objective has a very well reflecting coating. When the shutter is interrupting the path of rays of the objective, the light impinging upon the objective is reflected on a shutter 29. When the shutter is retracted out of the path of rays of the objective, a smaller part is reflected on the film. A portion of the reflected light is fed to the mirror 28 and guided onto a photo resistor 35. The photo resistor 35 is arranged in a Wheatstone bridge circuit 34, which is supplied from a battery 36. In the bridge diagonal a galvanometer 30 is arranged, the shaft of which carries the diaphragm blade 6 and the current feeder 31 and 32 of which are formed without a directive force to a coil 33. Through the individual resistances of the bridge circuit 34 the arrangement can be adapted to the exposure time and film sensitivity. The resulting light flux, necessary for the exposure of the film, is retained constant by the galvanometer 30 and the diaphragm blade 6. When deviating from the desired values a balance current occurs in the bridge diagonal, whereby the galvanometer 30 adjusts the diaphragm 6 until the actual value of the light flux coincides with the desired value. Then the bridge is again balanced and the galvanometer 30 is at rest. The arrangement can also be modified such, that the mirror 28 is arranged at an axial distance behind the mask 17a.

The present invention is not limited to the shown examples, but can be modified in many respects, chiefly as regards the lens types, the diaphragm shape and the diaphragm drive. Thus the adjustment of the movable diaphragm blade can be effected manually. It is also possible to provide a conventional viewfinder and to use the light, which is reflected through the mirror out of the objective channel only for the exposure control or measurement of exposure time. Instead of photo resistors, selenium barrier elements or the like can be provided for the measurement of exposure time, as well as photodiodes or phototransistors.

While we have disclosed several embodiments of the present invention, it is to be understood that these embodiments are given by example only and not in a limiting sense, the scope of the present invention being determined by the objects and the claims.

We claim:
1. In a camera,
  an objective means defining an optical axis,
  a movable diaphragm blade disposed within said objective and having a tapered opening,
  at least one stationary mask disposed in said objective,
  said movable diaphragm blade being arranged closely adjacent said stationary mask,
  the latter defining jointly with said movable diaphragm blade a diaphragm aperture of said objective,
  a viewfinder comprising an optical system,
  said stationary mask having a mirror coated surface inclined to said optical axis of said objective and reflecting light rays received by the mirror coated face out of the path of rays of said objective and to said optical system of said viewfinder, and
  the latter forming an image of the object to be taken.
2. The camera, as set forth in claim 1, wherein
  said stationary mask is disposed in front of said movable diaphragm blade and
  said mirror coated surface facing the object.

3. The camera, as set forth in claim 1, wherein
the optical axis of said optical system of said viewfinder is disposed parallel to the optical axis of said objective,
a mirror in said optical system of said viewfinder,
said mirror coated surface of said stationary mask being disposed within the rays impinging upon said objective with the center of gravity of said mirror surface set off the optical axis of said objective,
a part of said objective being disposed in front of said mirror coated surface of said stationary mask and forming a virtual image of the object at a finite distance,
the rays originating from the axial point of said image and running through the center of gravity of said mirror coated surface,
said rays form an angle with said optical axis of said objective, and
said mirror coated surface provided on said stationary mask of the diaphragm aperture forms an angle with said mirror provided within the optical system of the viewfinder.

4. The camera, as set forth in claim 1, which includes
a galvanometer,
a second mask disposed in said objective and carrying a second mirror,
a circuit including a photoelectric cell,
an optical system receiving light from the mirror coated surface of said second mirror collecting said light on said photoelectric cell,
said galvanometer is disposed in said circuit of said photoelectric cell and is energized by the latter in response to increased intensity of the incident light of the object, and
said galvanometer operates said movable diaphragm blade.

5. The camera, as set forth in claim 1, which includes
an electric circuit having a galvanometer and a photoelectric cell,
said photoelectric cell receiving light reflected from said mirror coated surface of said stationary mask, and
energizing said galvanometer in response to increased intensity of the incident light of the object.

6. In a camera,
an objective means defining an optical axis,
a movable diaphragm blade provided within said objective and having a tapered opening,
two stationary masks disposed in said objective,
said movable diaphragm blade being arranged closely adjacent said stationary masks,
the latter defining jointly with said movable diaphragm blade a diaphragm aperture of said objective,
an electric circuit including a galvanometer and a photoelectric call receiving light from said object means,
said galvanometer being energized by said photoelectric cell in response to increased intensity of the incident light of the object,
said galvanometer driving said movable diaphragm blade,
a mirror surface provided on each of said two stationary masks and inclined to the optical axis of said objective,
a viewfinder comprising an optical system including a mirror,
one of said mirror surfaces reflecting light rays originating from said objective means out of the path of rays of said objective and to said optical system of said viewfinder, and
another of said mirror surfaces reflects light rays originating from said objective means to said photoelectric cell.

7. The camera, as set forth in claim 6, which includes
a shutter disposed between said diaphragm and the image plane of the objective,
the shutter surface facing said diaphragm having a coated mirror,
the mirror surface on said stationary masks, reflecting light rays to said photoelectric cell, are provided on the rear surface of one of said stationary masks, and
a portion of the light reflected on said shutter surface is reflected by the mirror coated surface of said stationary mask and is fed to said photoelectric cell.

8. In a camera,
an objective means defining an optical axis,
a movable diaphragm blade disposed within said objective and having a tapered opening,
at least one stationary mask disposed in said objective,
said movable diaphragm blade being arranged closely adjacent said mask,
the latter defining jointly with said movable diaphragm blade a diaphragm aperture of the objective,
a mirror surface provided on the rear surface of said mask inclined to said optical axis,
a shutter arranged between said diaphragm blade and the image plane of said objective,
said shutter having a reflecting front surface,
an electric circuit including a photoelectric cell and a galvanometer, and
a portion of the light reflected on said shutter surface being reflected by said mirror coated surface of said mask and fed to said photoelectric cell.

References Cited in the file of this patent

UNITED STATES PATENTS

| | | |
|---|---|---|
| 2,105,557 | Slack | Jan. 18, 1938 |
| 2,655,848 | Gray | Oct. 20, 1953 |
| 3,033,093 | Stimson | May 8, 1962 |
| 3,043,181 | Brown | July 10, 1962 |